United States Patent
Fujino (10) Patent No.: US 7,522,325 B2
(45) Date of Patent: Apr. 21, 2009

(54) LIGHT SCANNING DEVICE

(75) Inventor: Hitoshi Fujino, Kasugai (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 12/017,433

(22) Filed: Jan. 22, 2008

(65) Prior Publication Data

US 2008/0174844 A1    Jul. 24, 2008

(30) Foreign Application Priority Data

Jan. 22, 2007    (JP) .............................. 2007-011254

(51) Int. Cl.
    *G02B 26/08*    (2006.01)
(52) U.S. Cl. .................. 359/213; 359/214; 359/224
(58) Field of Classification Search .................. None
    See application file for complete search history.

(56) References Cited

U.S. PATENT DOCUMENTS

2002/0163702 A1* 11/2002 Hori et al. ................... 359/204
2007/0253048 A1* 11/2007 Sakai et al. ................. 359/204

FOREIGN PATENT DOCUMENTS

| JP | 05-027189 | 2/1993 |
| JP | 2006-201520 | 8/2006 |

* cited by examiner

*Primary Examiner*—James Phan
(74) *Attorney, Agent, or Firm*—Banner & Witcoff, Ltd.

(57) ABSTRACT

A light scanning device includes: a light source; a lens which converts a light emitted from the light source to a parallel light flux; an oscillating mirror which oscillates rotationally; a mirror support body which supports the oscillating mirror and which includes a first opening; a light shield wall which is disposed between the lens and the oscillating mirror and which includes a second opening; and a diaphragm which is disposed between the light source and the light shield wall and which includes a third opening. A relation expression A1<W<B is satisfied, where W indicates a width of the second opening in any direction orthogonal to an optical axis, A1 indicates a width of the third opening in a direction corresponding to the direction of the width W of the second opening, and B indicates a width of the first opening in the direction corresponding to the direction.

11 Claims, 5 Drawing Sheets

LIGHT SCANNING DEVICE

CROSS-REFERENCE TO RELATED APPLICATION

This application claims priority from Japanese Patent Application No. 2007-011254, filed on Jan. 22, 2007, the entire subject matter of which is incorporated herein by reference.

TECHNICAL FIELD

Aspects of the present invention relate to a light scanning device including an MEMS mirror having an oscillating mirror which oscillates rotationally.

BACKGROUND

A MEMS (Micro Electro Mechanical Systems) mirror is known as a deflector for changing a reflection direction of an incident light (see, for example, JP-A-2006-201520). Specifically, this MEMS mirror comprises an oscillating mirror which oscillates rotationally, a mirror support body having an opening larger than the oscillating mirror, and a shank which connects the oscillating mirror and an edge part of the opening of the mirror support body.

Recently, it is considered that such MEMS mirror is applied as a scanning mirror for a light scanning device in an image forming apparatus such as a copying machine or a laser printer. In the case where the MEMS mirror is installed in such light scanning device, a light emitted from a light source passes through a lens or a diaphragm, and is projected onto the oscillating mirror of the MEMS mirror in which a reflection direction is properly changed by the rotational oscillation of the oscillating mirror.

SUMMARY

However, if the MEMS mirror is incorporated into the light scanning device as previously described, light is scattered on an inner peripheral face of an opening portion of the diaphragm, for example, resulting in the possibility that the light may be projected onto not only the oscillating mirror but also a region around the opening of the mirror support body. If the light is projected onto the region other than the oscillating mirror, a still ghost image is formed on a scanned surface by the light reflected from that region.

Aspects of the present invention relate to the above problem. According to at least one aspect of the present invention, a light scanning device is provided that can suppress occurrence of a still ghost image on the scanned surface.

According to an aspect of the present invention, a light scanning device includes: a light source; a lens which converts a light emitted from the light source to a parallel light flux; an oscillating mirror which oscillates rotationally and changes a reflection direction of the light flux from the lens to make scanning; a mirror support body which supports the oscillating mirror and which includes a first opening larger than the oscillating mirror; a light shield wall which is disposed between the lens and the oscillating mirror and which includes a second opening; and a diaphragm which is disposed between the light source and the light shield wall and which includes a third opening. In the above configuration, a relation expression A1<W<B is satisfied, where W indicates a width of the second opening in any direction orthogonal to an optical axis, A1 indicates a width of the third opening in a direction corresponding to the direction of the width W of the second opening, and B indicates a width of the first opening in the direction corresponding to the direction of the width W of the second opening.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Exemplary Embodiment

Figure 1:
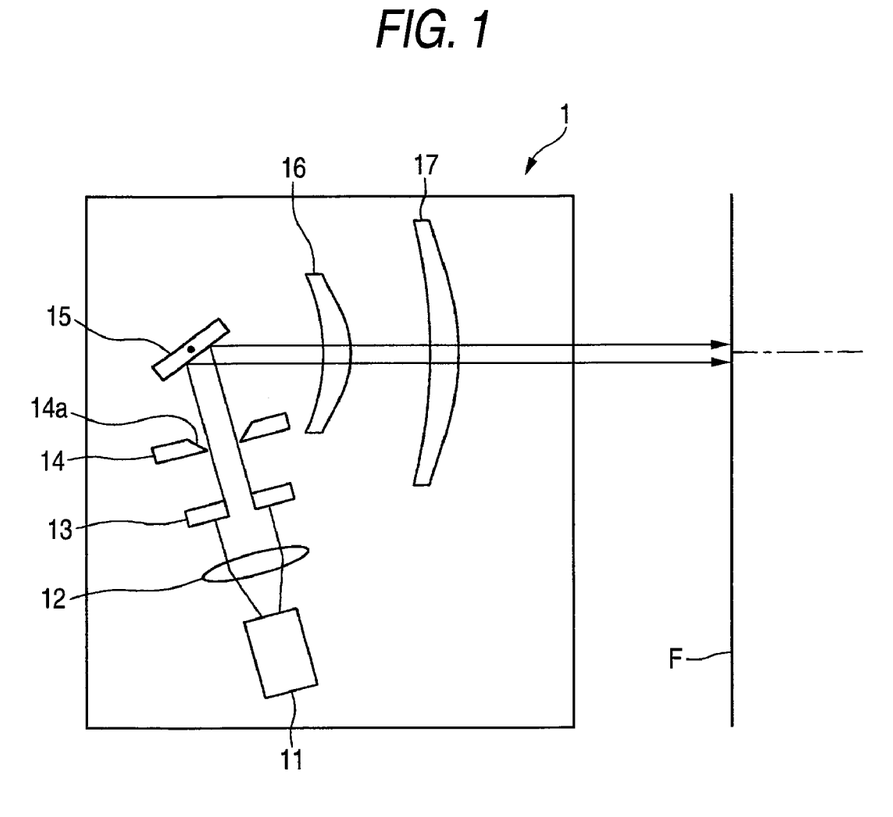
FIG. 1 is a configuration view showing a light scanning device according to a first exemplary embodiment of the present invention.
Figure 2A:
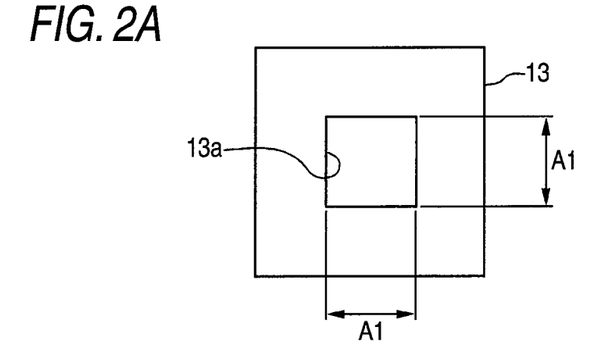
FIG. 2A is a plan view showing a diaphragm member.
Figure 2B:
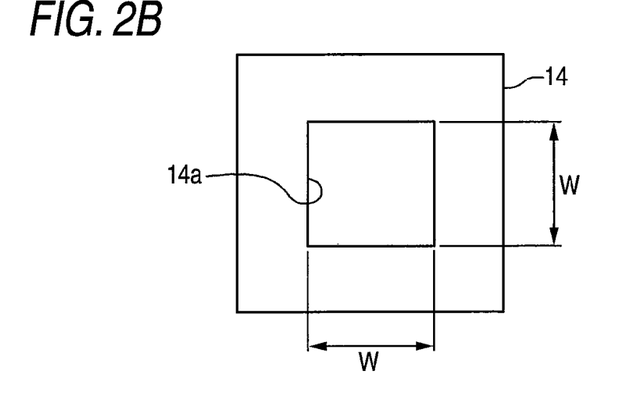
FIG. 2B is a plan view showing a light shield wall.
Figure 2C:
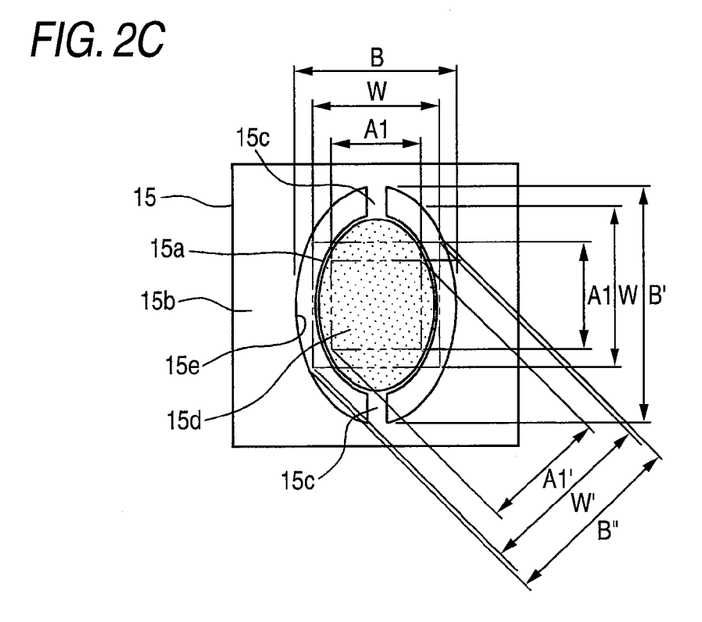
FIG. 2C is a plan view showing a MEMS mirror.

A first exemplary embodiment of the present invention will be described below in detail with reference to the drawings. In the drawings, FIG. 1 is a configuration view showing a light scanning device according to the first exemplary embodiment of the present invention. FIG. 2A is a plan view showing a diaphragm member, FIG. 2B is a plan view showing a light shield wall, and FIG. 2C is a plan view showing an MEMS mirror.

[Light Scanning Device 1]

As shown in FIG. 1, alight scanning device 1 comprises a laser diode 11 as one example of a light source, a coupling lens 12 as one example of a lens, a diaphragm member 13, a light shield wall 14, an MEMS mirror 15 and scanning lenses 16, 17. And these components are arranged in the order of the laser diode 11, the coupling lens 12, the diaphragm member 13, the light shield wall 14, the MEMS mirror 15, the scanning lens 16 and the scanning lens 17 in a light direction. Herein, the laser diode 11 which emits light divergently, the coupling lens 12 and the scanning lenses 16, 17 have known configurations, and the detailed explanation thereof is omitted. The coupling lens 12 in the first exemplary embodiment converts a light emitted divergently from the laser diode 11 into a parallel light flux.

[Diaphragm Member 13]

The diaphragm member 13 is disposed between the coupling lens 12 and the MEMS mirror 15 to narrow (restrict) the parallel light flux converted by the coupling lens 12 to a predetermined dimension and shape. Specifically, the diaphragm member 13 is formed with an opening 13a of square shape for narrowing the light flux as shown in FIG. 2A. The longitudinal width and the transverse width of the opening 13a have a predetermined length "A1".

[Light Shield Wall 14]

The light shield wall 14 is disposed between the diaphragm member 13 and the MEMS mirror 15 to shut off the light (including the scattered light on an inner surface of the opening 13a of the diaphragm member 13) that can not be narrowed by the diaphragm member 13. Specifically, the light shield wall 14 has an opening 14a gradually enlarging from an incident side (light incident side) to an outgoing side (light outgoing side) of the light. Since the opening 14a is gradually enlarged, the light flux narrowed by the diaphragm member 13 passes through the light shield wall 14 without being scattered on an inner surface of the opening 14a. As shown in FIG. 2B, this opening 14a is formed in the square shape of a predetermined length "W" in the longitudinal width and the transverse width. The details of each width (longitudinal width W, transverse width W) of this opening 14a will be described later.

[MEMS Mirror 15]

As shown in FIG. 2C, the MEMS mirror 15 comprises an oscillating mirror 15a, a mirror support body 15b, and a shank 15c. The MEMS mirror 15 of the first exemplary embodiment is driven by an electromagnetic drive method, and has a magnet (not shown) which generates a magnetic field on the peripheral.

The oscillating mirror 15a is formed to have an elliptical shape, and is formed with an elliptical mirror part 15d which reflects light on a surface thereof, and a coil (not shown) internally. If current flows through this coil, the current flows in the magnetic field so that an electromagnetic force is exerted to the oscillating mirror 15a and causes the oscillating mirror 15a to be inclined about the shank 15c.

The mirror support body 15b has an elliptical opening 15e larger than the oscillating mirror 15a, and supports the oscillating mirror 15a via the shank 15c in the opening 15e. The opening 15e has a transverse width of predetermined length "B" and a longitudinal width of length "B'" larger than the transverse width B.

The shank 15c is disposed symmetrically about the center of the oscillating mirror 15a and serves as a rotational axis of the oscillating mirror 15a. Also, this shank 15c is elastically deformable, and thereby functions to restore the oscillating mirror 15a inclined on one side due to electromagnetic force to the opposite side. Therefore, the oscillating mirror 15a oscillates (rotationally vibrates) within a predetermined range by an electromagnetic force and an elastic force of the shank 15c and changes the reflection direction of the light flux outgoing from the coupling lens 12 and passing through the opening 13a of the diaphragm member 13 and the opening 14a of the light shield wall 14, thereby scanning over a scanned surface F.

The details of the opening 14a of the light shield wall 14 will be described below. As shown in FIG. 2C, the widths (e.g., transverse width W, longitudinal width W, and diagonal width W') of the opening 14a of the light shield wall 14 in any direction orthogonal to an optical axis are set to satisfy all the following relation expressions (1) to (3). The relation expression expresses relations between the widths (transverse width A1, longitudinal width A1, diagonal width A1') of the opening 13a of the diaphragm member 13 corresponding to the width of the opening 14a in the predetermined directions and the widths (transverse width B, longitudinal width B', diagonal width B") of the opening 15e of the mirror support body 15b corresponding to the widths of the opening 14a in the predetermined directions.

$$A1 < W < B \quad (1)$$

$$A1 < W < B' \quad (2)$$

$$A1' < W' < B'' \quad (3)$$

In the above expression, for the sake of convenience, the relationships only in the longitudinal width, the transverse width and the diagonal width are represented in the above expressions. However, a width of the opening 24a of the light shield wall 24 in any direction, a width of the opening 13a of the diaphragm 13 in a direction corresponding to the direction of the width of the opening 24a and a width of the opening 15e of the mirror support body 15b in the direction corresponding to the direction of the width of the opening 24a also satisfy an expression similar to the above expressions.

The width of the opening 14a of the light shield wall 14 determined in the above manner is sufficiently smaller than the distance between the light shield wall 14 and the diaphragm member 13. Therefore, when the light (scattered light) scattered on the opening 13a of the diaphragm member 13 passes through the opening 14a of the light shield wall 14, the passing scattered light is directed as the almost parallel light flux (light flux along the parallel light flux narrowed by the diaphragm member 13) toward the MEMS mirror 15.

The operation of the light scanning device 1 will be described below. When a light is emitted from the laser diode 11, as shown in FIG. 1, the light is converted into a parallel light flux by the coupling lens 12, and narrowed by the diaphragm member 13 to proceed to the MEMS mirror 15. At this time, most of the light (scattered light) scattered on the inner surface of the opening 13a of the diaphragm member 13 is shielded excellently by the light shield wall 14. A part of the scattered light passes through the opening 14a of the light shield wall 14. However, since this scattered light is restricted to the width of W (W') or less by the opening 14a of the light shield wall 14, the scattered light on the MEMS mirror 15 is received within the opening 15e of the mirror support body 15b. Therefore, the projection of light onto the region around the opening 15e of the mirror support body 15b is suppressed. In order to more securely receive the scattered light after passing through the opening 14a of the light shield wall 14 within the opening 15e of the mirror support body 15b, it is advantageous that the light shield wall 14 is located closer to the MEMS mirror 15.

After the light flux narrowed by the diaphragm member 13 reaches the MEMS mirror 15, the light flux is swung by the rotational oscillation of the oscillating mirror 15a to scan over the scanned surface F.

As described above, the first exemplary embodiment may have the following effects.

Since the width (W, W') of the opening 14a of the light shield wall 14 is larger than the widths (A1, A1') of the opening 13a of the diaphragm member 13 and smaller than the widths (B, B', B") of the opening 15e of the mirror support body 15b, the projection of light onto the region around the opening 15e of the mirror support body 15b is suppressed. Therefore, the occurrence of a still ghost image on the scanned surface F can be suppressed.

Since the opening 14a of the light shield wall 14 is gradually enlarged from the incident side to the outgoing side of the light so that the inside of the opening 14a is sharpened acutely, it is possible to suppress the scattering of light on the inner surface of the opening 14a, and further suppress the occurrence of a still ghost image on the scanned surface F.

Second Exemplary Embodiment

Figure 3A:
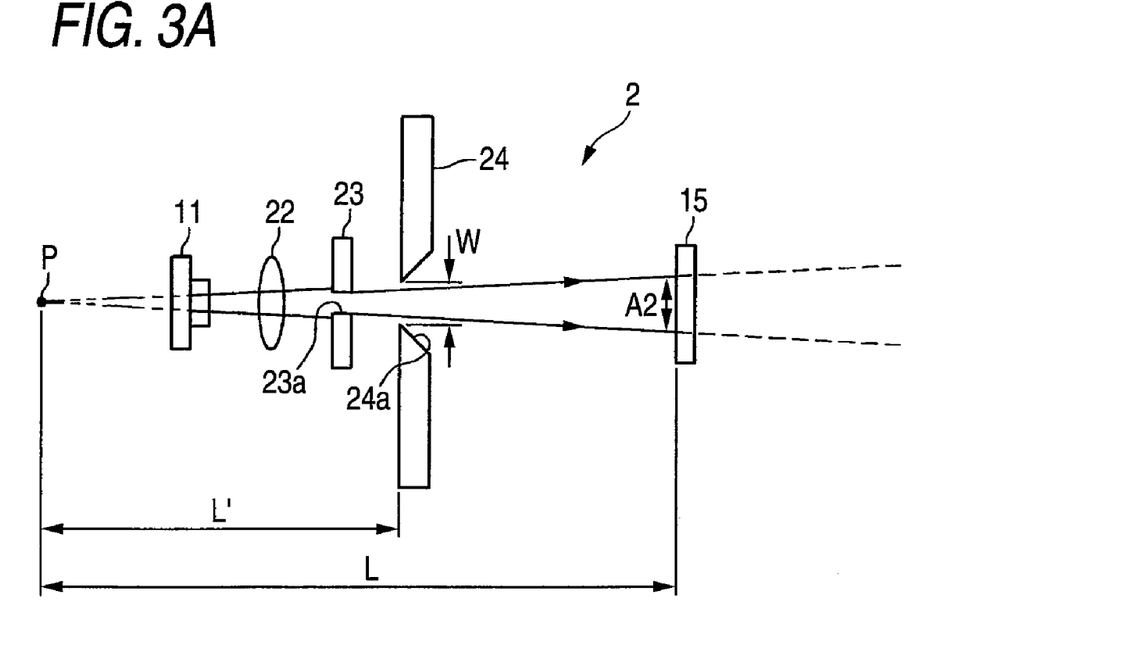
FIG. 3A is a configuration view showing a part of components of a light scanning device according to a second exemplary embodiment of the present invention.
Figure 3B:
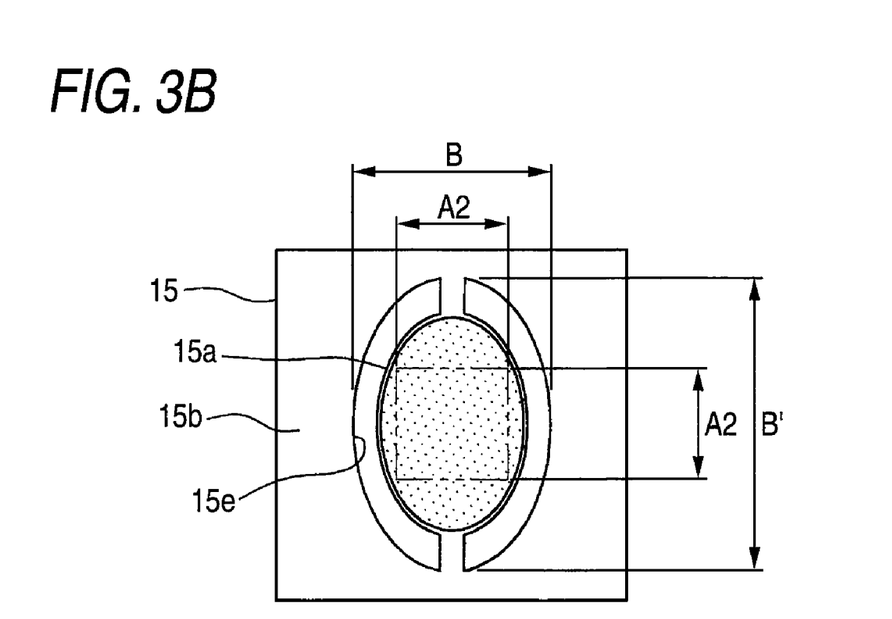
FIG. 3B is a plan view showing a MEMS mirror.

A second exemplary embodiment of the present invention will be described below in detail with reference to the drawings. In the second exemplary embodiment, since a part of the configuration of the light scanning device according to the first exemplary embodiment is changed, the same reference numerals are attached to the same components as in the first exemplary embodiment, and the explanation thereof is omitted. In the drawings, FIG. 3A is a configuration view showing a part of the components of a light scanning device according to the second exemplary embodiment of the present invention, and FIG. 3B is a plan view showing the MEMS mirror. In FIGS. 3A and 3B, the scanning lenses 16 and 17 that are same components as in the first exemplary embodiment are omitted.

As shown in FIG. 3A, the light scanning device 2 according to the second exemplary embodiment comprises a coupling lens 22, a diaphragm member 23 and a light shield wall 24, which are different from the first exemplary embodiment.

The coupling lens 22 is formed to convert a light emitted from the laser diode 11 into a divergent light flux. Herein, if the light flux divergent at a predetermined angle by the coupling angle 22 is extended virtually to the side of the laser diode 11, it is converged at a predetermined position on a side of the laser diode 11. In the second exemplary embodiment, this point is assumed to be a light converged point.

The diaphragm member 23 and the light shield wall 24 are only different in the width of each opening 23a, 24a from the diaphragm member 13 and the light shield wall 14 of the first exemplary embodiment, but are the same in the other form as the diaphragm member 13 and the light shield wall 14 of the first exemplary embodiment. Particularly, the diaphragm member 23 has a square opening 23a. The width of the opening 23a and the position from the MEMS mirror 15 are properly determined so that the narrowed width of light may become a predetermined width "A2" on the MEMS mirror 15, as shown in FIG. 3B.

The light shield wall 24 has a square opening 24a, in which the width "W" of the opening 24a is set to satisfy all the following relation expressions (4) and (5). In the second exemplary embodiment, only the longitudinal width and the transverse width are representatively shown.

$$(A2 \cdot L')/L \leq W < (B \cdot L')/L \quad (4)$$

$$(A2 \cdot L')/L \leq W < (B' \cdot L')/L \quad (5)$$

where A2 is the width in a direction corresponding to the direction of the width W in the cross section of the light flux when the light flux restricted by the diaphragm member 23 is projected onto the MEMS mirror 15, B is the transverse width of the opening 15e of the mirror support body 15b, B' is the longitudinal width of the opening 15e of the mirror support body 15b, L is the distance from the light converged point P of the light flux to the MEMS mirror 15, and L' is the distance from the light converged point P of the light flux to the light shield wall 24.

Specifically, the distance L is the length from the light converged point P to the center of the oscillating mirror 15a when the oscillating mirror 15a is still state. Further, the distance L' is the length from the light converged point P to the edge part of the opening 24a of the light shield wall 24 on the light incident side.

In the above explanation, for the sake of convenience, the relationship between the longitudinal width and the transverse width is only represented in the expressions. However, a width of the opening 24a of the light shield wall 24 in any direction is set to satisfy an expression similar to the above expression. That is, for example, when the width of the opening 24a in the diagonal direction is "W'", the width corresponding to the width W' in the cross section of the light flux when the light flux restricted by the diaphragm member 23 is projected onto the MEMS mirror 15, is "A2'", and the width of the opening 15e of the mirror support body 15b corresponding to the width W' is "B'''", the width W' may be set to satisfy the following expression (6).

$$(A2' \cdot L')/L \leq W' < (B'' \cdot L')/L \quad (6)$$

The operation of the light scanning device 2 will be described below. When a light is emitted from the laser diode 11, as shown in FIG. 3A, the light is converted into a diverging light flux (divergent light flux) by the coupling lens 12, and narrowed by the diaphragm member 23 to proceed to the MEMS mirror 15. Herein, since the width W of the opening 24a of the light shield wall 24 is formed in a width of (A2·L')/L or more, the light flux passing through the diaphragm member 23 and reaching the opening 24a of the light shield wall 24 is securely passed through the opening 24a of the light shield wall 24, and projected onto the oscillating mirror 15a with a predetermined width A2.

At this time, most of the light (scattered light) scattered on the inner surface of the opening 23a of the diaphragm member 23 is shielded excellently by the light shield wall 24, and a part of the scattered light passes through the opening 24a of the light shield wall 24. Since the width of the opening 24a of the light shield wall 24 is smaller than (B·L')/L, the scattered light on the MEMS mirror 15 is received within the opening 15e of the mirror support body 15b, even if the scattered light passing through the opening 24a of the light shield wall 24 proceeds to gradually spread (along the divergent light narrowed by the diaphragm member 23). Therefore, the projection of light onto a region around the opening 15e of the mirror support body 15b is suppressed.

As described above, the second exemplary embodiment may have the following effects.

Even if the light flux projected onto the MEMS mirror 15 is divergent light, the projection of light onto the region around the opening 15e of the mirror support body 15b is suppressed by providing the light shield wall 24 having the opening with a predetermined width W. Therefore, the occurrence of a still ghost image on the scanned surface can be suppressed.

Third Exemplary Embodiment

A third exemplary embodiment of the present invention will be described below in detail with reference to the drawings. In the third exemplary embodiment, since a part of the configuration of the light scanning device according to the first exemplary embodiment is changed, the same reference numerals are attached to the same components as in the first exemplary embodiment, and the explanation thereof is omitted. In the drawings, FIG. 4A is a configuration view showing a part of the components of a light scanning device according to the third exemplary embodiment of the present invention, and FIG. 4B is a plan view showing the MEMS mirror.

Figure 4A:
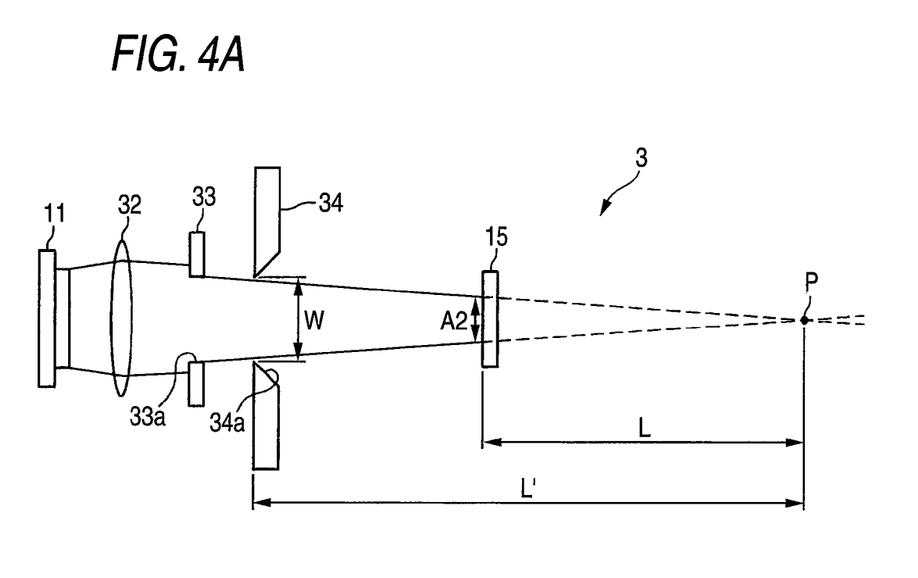
FIG. 4A is a configuration view showing a part of components of a light scanning device according to a third exemplary embodiment of the present invention.
Figure 4B:
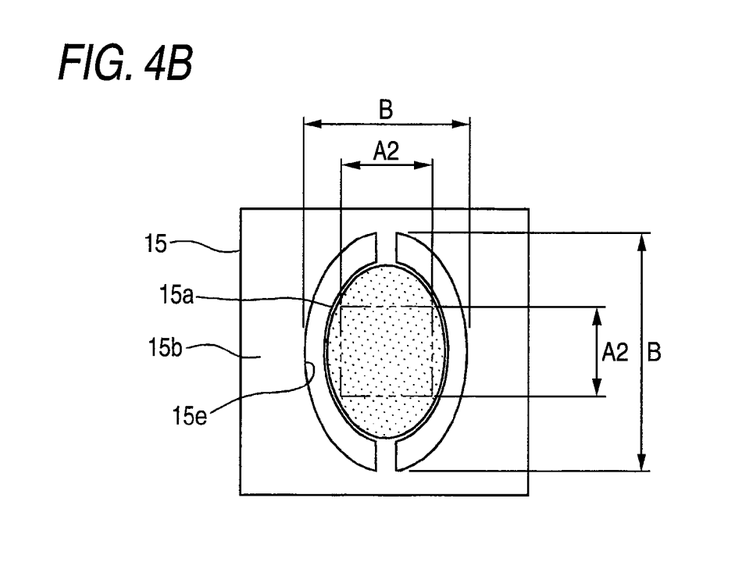
FIG. 4B is a plan view showing a MEMS mirror.

As shown in FIG. 4A, the light scanning device 3 according to the third exemplary embodiment comprises a coupling lens 32, a diaphragm member 33 and a light shield wall 34, which are different from the first exemplary embodiment.

The coupling lens 32 is formed to convert a light emitted from the laser diode 11 into a convergent light flux. Herein, if the light flux converged at a predetermined angle by the coupling angle 32 is extended virtually, it is converged at a predetermined position on a side of the MEMS mirror 15. In the third exemplary embodiment, this point assumed to be a light converged point P.

The diaphragm member 33 and the light shield wall 34 are only different in the width of each opening 33a, 34a from the diaphragm member 13 and the light shield wall 14 of the first exemplary embodiment, but are the same in the other form as the diaphragm member 13 and the light shield wall 14 of the first exemplary embodiment. Particularly, the diaphragm member 33 has a square opening 33a, in which the width of the opening 33a and the position from the MEMS mirror 15 are properly determined so that the narrowed width of light may become a predetermined width "A2" on the MEMS mirror 15, as shown in FIG. 4B.

The light shield wall 34 has a square opening 34a, in which the width "W" of the opening 34a is set to satisfy all the following relation expressions (7) and (8). In the third exemplary embodiment, only the longitudinal width and the transverse width are representatively shown.

$$(A2 \cdot L')/L \leq W < (B \cdot L')/L \quad (7)$$

$$(A2 \cdot L')/L \leq W < (B' \cdot L')/L \quad (8)$$

where A2 is the width corresponding to the width W of the cross section of the light flux when the light flux restricted by the diaphragm member 33 is projected onto the MEMS mirror 15, B is the transverse width of the opening 15e of the mirror support body 15b, B' is the longitudinal width of the opening 15e of the mirror support body 15b, L is the distance from the light converged point P of the light flux to the MEMS mirror 15, and L' is the distance from the light converged point P of the light flux to the light shield wall 34.

Specifically, the distance L is the length from the light converged point P to the center of the oscillating mirror 15a when the oscillating mirror 15a is still state. Further, the distance L' is the length from the light converged point P to the edge part of the opening 34a of the light shield wall 34 on the light incident side.

In the above explanation, for the sake of convenience, only the relationship between the longitudinal width and the transverse width is only represented in the expression, though the width of the opening 34a of the light shield wall 34 in any direction is set to satisfy an expression similar to the above expression. That is, for example, when the width of the opening 34a in the diagonal direction is "W'", the width of corresponding to the width W' in the cross section of the light flux when the light flux restricted by the diaphragm member 33 is projected onto the oscillating mirror 15a, is "A2'", and the width of the opening 15e of the mirror support body 15b corresponding to the width W' is "B'''", the width W' may be set to satisfy the following expression (9).

$$(A2' \cdot L')/L \leq W' < (B'' \cdot L')/L \quad (9)$$

The operation of the light scanning device 3 will be described below. When a light is emitted from the laser diode 11, as shown in FIG. 4A, the light is converted into a converging light flux (convergent light) by the coupling lens 32, and narrowed by the diaphragm member 33 to proceed to the MEMS mirror 15. Herein, since the width W of the opening 34a of the light shield wall 34 is formed in a width of (A2·L')/L or more, the light flux passing through the diaphragm member 33 to reach the opening 34a of the light shield wall 34 is securely passed through the opening 34a of the light shield wall 34, and projected onto the oscillating mirror 15a with a predetermined width A2.

At this time, most of the light (scattered light) scattered on the inner surface of the opening 33a of the diaphragm member 33 is shielded excellently by the light shield wall 34, and a part of the scattered light passes through the opening 34a of the light shield wall 34. Since the width W of the opening 34a of the light shield wall 34 is smaller than (B·L')/L, the scattered light on the MEMS mirror 15 is received within the opening 15e of the mirror support body 15b, if the scattered light passing through the opening 34a of the light shield wall 34 proceeds to gradually narrow (along the convergent light narrowed by the diaphragm member 23). Therefore, the projection of light onto the region around the opening 15e of the mirror support body 15b is suppressed.

As described above, the third exemplary embodiment may have the following effects.

Even if the light flux projected onto the MEMS mirror 15 is the convergent light, the projection of light onto the region around the opening 15e of the mirror support body 15b is suppressed by providing the light shield wall 34 having the opening with a predetermined width W. Therefore, the occurrence of a still ghost image on the scanned surface can be suppressed.

The present invention is not limited to exemplary embodiments described above with reference to the accompanying drawings. The following embodiments may also fall within technical scope of the present invention.

Though in each of the above exemplary embodiments, the opening of the diaphragm member or the light shield wall is square and the opening of the mirror support body is elliptical, the present invention is not limited thereto, but the opening of the diaphragm member or the light shield wall may be elliptical, circular or rectangular, and the opening of the mirror support body may be square, circular or rectangular.

Though in each of the above exemplary embodiments, the opening of the light shield wall is formed to enlarge gradually from the light incident side to the light outgoing side, the present invention is not limited thereto, but the opening may have any shape. The opening of the light shield wall is advantageous which has a sharpened portion on the inside as in each of the above exemplary embodiments. To form the sharp shape, besides each of the above exemplary embodiments, for example, the opening of the light shield wall may be formed to enlarge gradually from the light outgoing side to the light incident side. Also, the opening of the light shield wall may be formed to enlarge gradually from the center of the inner surface of the opening to the light outgoing side and the light incident side respectively.

Though in each of the above exemplary embodiments, the MEMS mirror is driven by the electromagnetic drive method, the present invention is not limited thereto, but an electrostatic drive method for oscillating the oscillating mirror by electrostatic force may be employed, for example.

Figure 5:
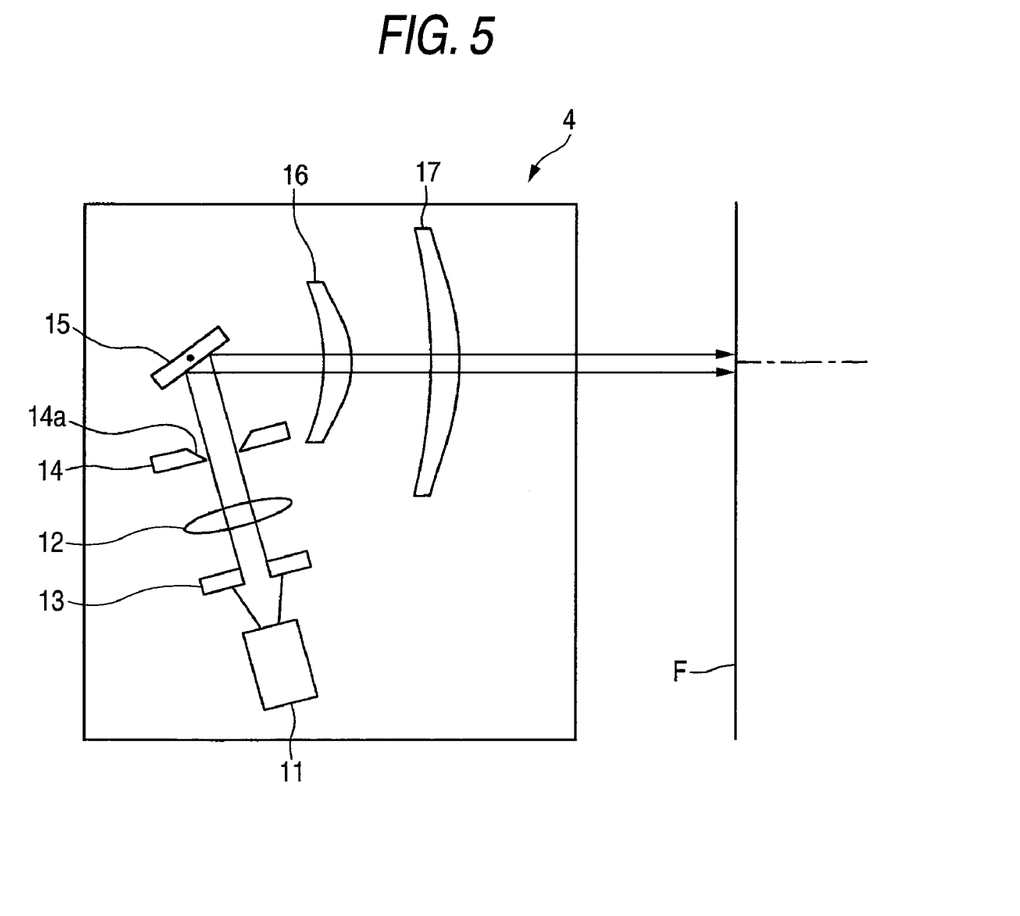
FIG. 5 is a configuration view showing a light scanning device according to another exemplary embodiment.

Though in each of the above exemplary embodiments, the diaphragm member is disposed between the coupling lens and the light shield wall, the invention is not limited thereto. For example, the diaphragm member may be disposed between the laser diode and the coupling lens as shown in FIG. 5. That is, the diaphragm member can be disposed between the light source and the light shield wall.

Though in each of the above exemplary embodiments, the laser diode is employed as the light source, the invention is not limited thereto, but a light emitting diode may be employed, for example.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A light scanning device comprising:
   a light source;
   a lens which converts a light emitted from the light source to a parallel light flux;

an oscillating mirror which oscillates rotationally and changes a reflection direction of the light flux from the lens to make scanning;

a mirror support body which supports the oscillating mirror and which includes a first opening larger than the oscillating mirror;

a light shield wall which is disposed between the lens and the oscillating mirror and which includes a second opening; and a diaphragm which is disposed between the light source and the light shield wall and which includes a third opening, wherein a relation expression $A1<W<B$ is satisfied, where W indicates a width of the second opening in any direction orthogonal to an optical axis, A1 indicates a width of the third opening in a direction corresponding to the direction of the width W of the second opening, and B indicates a width of the first opening in the direction corresponding to the direction of the width W of the second opening.

2. The light scanning device according to claim 1, wherein the diaphragm is disposed between the lens and the light shield wall.

3. The light scanning device according to claim 1, wherein the diaphragm is disposed between the light source and the lens.

4. The light scanning device according to claim 1, wherein the light shield wall includes a sharpened portion on an edge of the second opening thereof.

5. The light scanning device according to claim 1, wherein the mirror support body includes a shank which connects to the oscillating mirror and allows the oscillating mirror to oscillate rotationally about the shank, and wherein the oscillating mirror is arranged in the first opening of the mirror support body.

6. A light scanning device comprising:

a light source;

a lens which converts a light emitted from the light source to a convergent or a divergent light flux;

an oscillating mirror which oscillates rotationally and changes a reflection direction of the light flux from the lens to make scanning;

a mirror support body which supports the oscillating mirror and which includes a first opening larger than the oscillating mirror;

a light shield wall which is disposed between the lens and the oscillating mirror and which includes a second opening;

a diaphragm which is disposed between the light source and the light shield wall and which includes a third opening, wherein a relation expression $(A2 \cdot L')/L \leqq W < (B \cdot L')/L$ is satisfied, where W indicates a width of the second opening in any direction orthogonal to an optical axis, A2 indicates a width of a cross section of the light flux in a direction corresponding to the direction of the width W when the light flux restricted by the diaphragm is projected onto the oscillating mirror, B indicates a width of the first opening in the direction corresponding to the direction of the width W of the second opening, L indicates a distance from a light converged point of the light flux to the oscillating mirror, and L' indicates a distance from the light converged point of the light flux to the light shield wall.

7. The light scanning device according to claim 6, wherein the diaphragm is disposed between the lens and the light shield wall.

8. The light scanning device according to claim 6, wherein the diaphragm is disposed between the light source and the lens.

9. The light scanning device according to claim 6, wherein the light shield wall includes a sharpened portion on an edge of the second opening thereof.

10. The light scanning device according to claim 6, wherein the mirror support body includes a shank which connects to the oscillating mirror and allows the oscillating mirror to oscillate rotationally about the shank, and wherein the oscillating mirror is arranged in the first opening of the mirror support body.

11. A light scanning device comprising:

a light source;

a lens which converts a light emitted from the light source into a parallel light flux;

a mirror unit including:
  a mirror holder including a first opening;
  a shank;
  an oscillating mirror which rotationally oscillates about the shank in the first opening;

a light shield wall which is disposed between the lens and the mirror unit and which includes a second opening; and a diaphragm which is disposed between the light source and the light shield wall and which includes a third opening, wherein an area of the second opening is smaller than an area of the first opening, and wherein the area of the second opening is larger than an area of the third opening.

* * * * *